Oct. 31, 1950 J. E. BENNETT 2,527,695
DEVICE FOR COMMINUTING FRUITS AND VEGETABLES
Filed Nov. 15, 1949 3 Sheets-Sheet 2
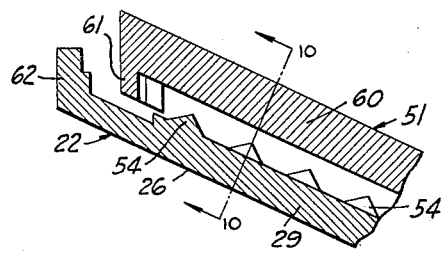
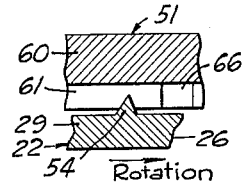
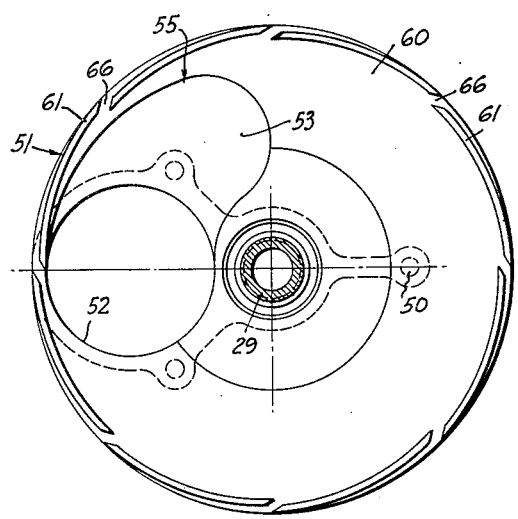
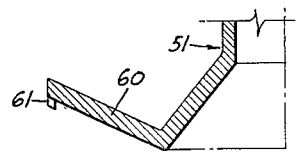
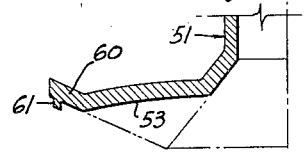
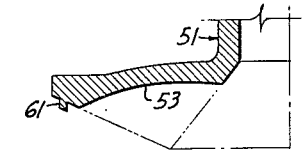
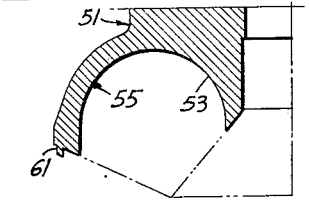
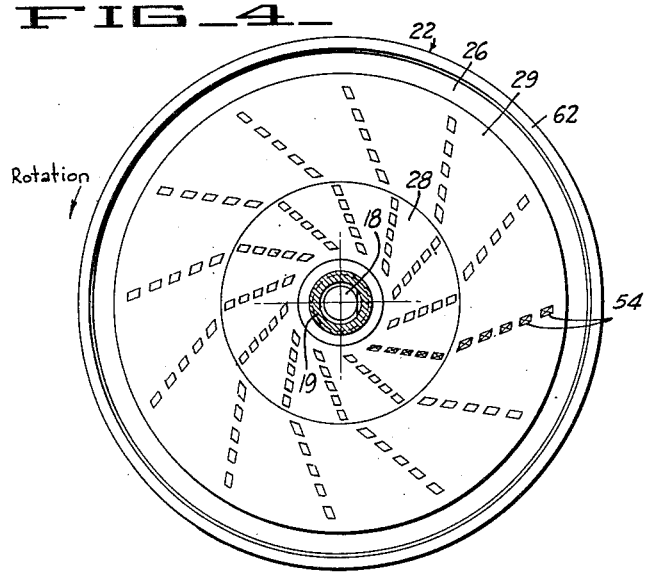
INVENTOR.
John E. Bennett
BY
ATTORNEY

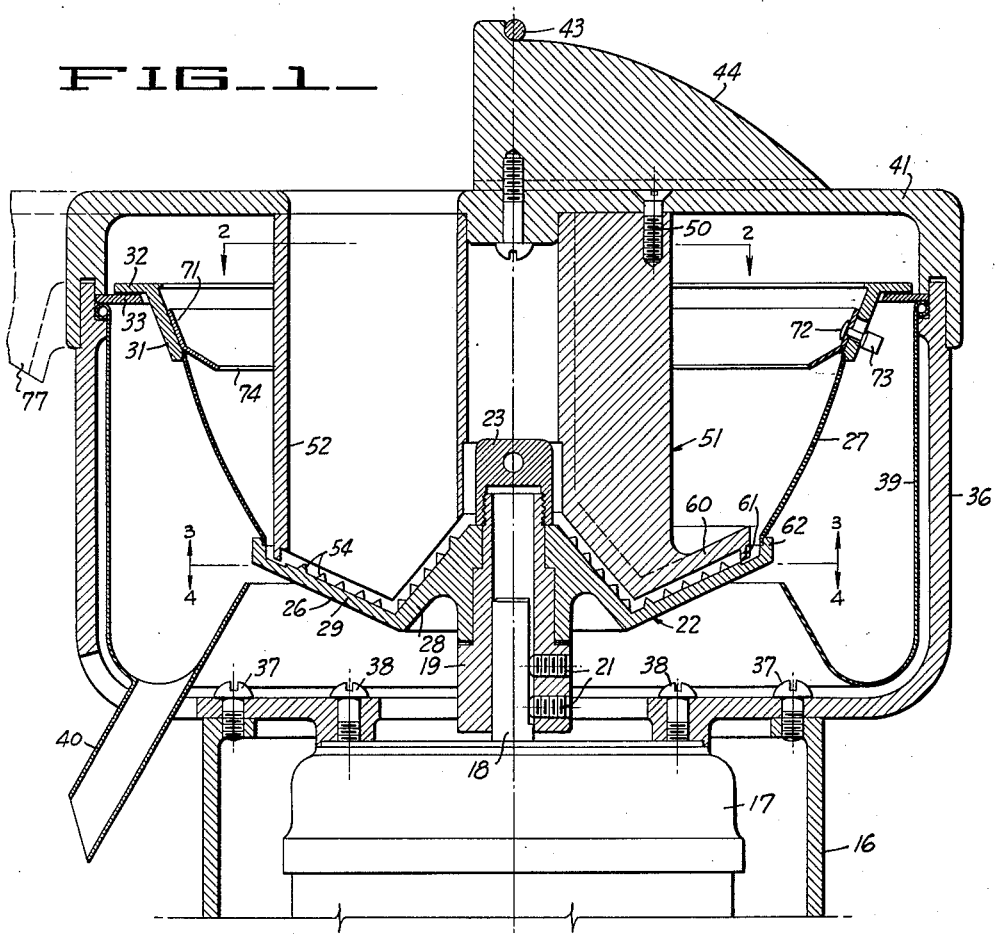

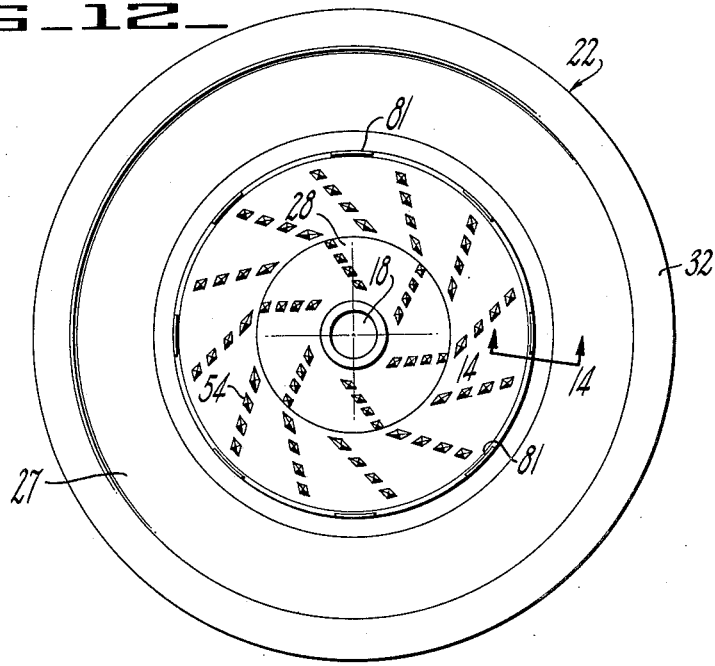
FIG_12_
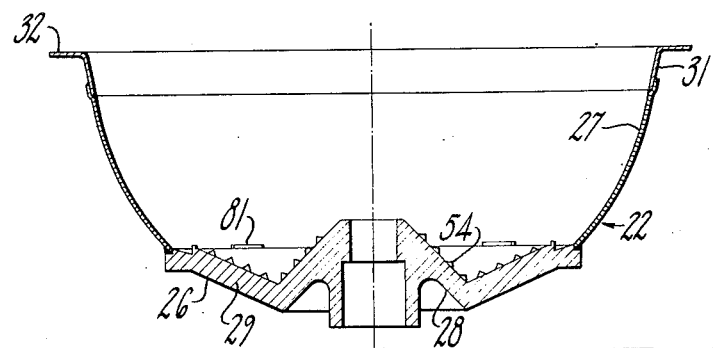
FIG_13_
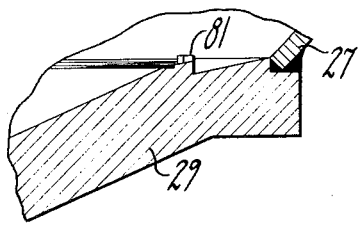
FIG_14_
INVENTOR.
John E. Bennett
BY
ATTORNEY Patented Oct. 31, 1950

2,527,695

UNITED STATES PATENT OFFICE 2,527,695

DEVICE FOR COMMINUTING FRUITS AND VEGETABLES

John E. Bennett, San Francisco, Calif.

Application November 15, 1949, Serial No. 127,407

12 Claims. (Cl. 146—76)

This is a continuation-in-part of my application Serial No. 84,145, filed March 29, 1949, now abandoned.

This invention relates to a device for comminuting fruits and vegetables to separate the liquid content from the solid fibrous portion. Devices of this general nature have been known and used heretofore and the present invention relates particularly to an improved device of the type disclosed in my previous Patent 2,387,975.

In the preparation of fresh fruit and vegetable juices, it is desirable that the fibrous pulp be as free of liquid as is feasible so that a maximum extraction of the juice is effected. It is also desirable to convert fruits and vegetables of a fibrous, tough nature, such as cabbage, apples, grapes, pears, celery and the like into juices; the present invention is particularly concerned with an improved device for comminuting fibrous fruits and vegetables, and for extracting the juice therefrom with a relatively high degree of efficiency.

It is in general the broad object of the present invention to provide an improved fruit and vegetable comminution device for separating the juice from the solid portion with a high degree of efficiency.

The invention includes other objects and features of advantage, some of which, together with the foregoing, will appear hereinafter wherein the present preferred form of fruit and vegetable comminuting device is disclosed. In the drawings accompanying and forming a part hereof, Figure 1 is a side elevation, partly in section.

Figure 2 is a section taken along the line 2—2 of Figure 1.

Figure 3 is a section taken along the lines 3—3 in Figure 1.

Figure 4 is a section taken along the line 4—4 in Figure 1.

Figures 5, 6, 7 and 8 are, respectively, sections taken along the indicated radial lines in Figure 2.

Figure 9 is an enlarged fragmentary sectional view showing the relation between two of the comminution elements.

Figure 10 is a section taken along the line 10—10 in Figure 9.

Figure 11 is a fragmentary section showing a modified form of the means employed for ensuring release of dry pulp.

Figure 12 is a plan view of a modified form of basket.

Figure 13 is a side elevation of the basket shown in Figure 11.

Figure 14 is a section along the line 14—14 in Figure 12.

Referring to the drawings, the device comprises a suitable base structure 16 having a motor 17 suitably mounted therein, the latter having a drive shaft 18 extending vertically and carrying a clutch element 19 secured thereto by set screws 21. A rotatable basket 22 is mounted upon the clutch 19 and is removably secured to this by the nut 23, the latter being screwed into position on the end of the clutch to force the basket 22 into a tight engagement with the clutch 19.

The basket 22 includes a comminution section 26 and a foraminous basket 27; the comminution portion is formed with a first portion 28 extending outwardly and downwardly from the clutch element 19 and being continued by an upwardly extending portion 29, the two portions, when viewed in cross section, being in the form of a W as these are disposed about the rotatable motor shaft. The basket includes a rim 31 having a flange 32 thereon, fitting closely adjacent to but extending above a removable gasket or sealing member 33.

The basket rotates within a casing 36, the latter being secured by screws 37 to the casing 16 and by screws 38 to the motor 17. To collect juice passing through the foraminous basket 27, the casing 36 carries a collecting ring 39 having a spout 40 through which the juice is drained. The upper portion of casing 36 is closed by cover 31, secured in place by a bale 43, hinged on opposite sides of casing 36 and engaging arcuate handle 44.

Mounted upon the cover by screws 50 is a stationary cutting member 51 having a feed duct 52 therein leading into a lower portion 55 which is arcuately formed as at 53 and sloping downwardly in the direction of rotation to feed material in to engage the teeth 54 on the rotating basket 22; the terminal position 60 of the member 51 is closely adjacent to the basket. The teeth 54 on the basket are preferably arranged in staggered rows and extend radially outwardly in the direction or rotation of the basket, as is shown in Figure 4.

In accordance with this invention, the outer periphery of the stationary member 51 is formed with a circular depending flange 61, this flange cooperating with a similar annular flange 62 disposed about the outer periphery of the basket, the two flanges are concentric and one extends beyond the terminal edge of the other so that a relatively narrow gap or passage is provided between the outer periphery of the basket and the stationary member 51 to retain fibrous particles between the stationary member and the rotating basket until they are cut and abraded to a very small size. Flange 61 can be continuous or can be formed in several segments each separated by a relatively narrow passage 66, as appears in Figure 3, from the next segment, the several segments curving inwardly in the direction of rotation of the basket.

When it is desired to comminute fibrous fruits and vegetables of which celery is typical, it is desirable to provide an outer group of teeth segments 81 extending radially about the outer portion of the comminution portion of the basket and closely adjacent but within flange 62. The teeth are spaced apart so that fibers are caught and cut by the teeth and by cooperating teeth or knives 61 on the stationary feeding element.

To insure that the solid material is dried adequately before it is released from the basket, I preferably mount an annular retaining ring 71 so it can move axially of the basket; in the form shown, removable pins 72 having weights 73 thereon acts as guides and supporting the ring in a desired position of adjustment. Ring 71 includes an inwardly extending flange 74 so that solid material must build up on the basket 27 to a considerable depth before it can pass over the lip of flange 74 or between ring 71 and ring 31 to emerge over the side of the basket into casing 41 and thence outwardly through solid discharge spout 77.

In use, solid material is fed into the feed well 52 to pass downwardly between the stationary member and the rotating basket and be comminuted by the cooperately positioned teeth and feed member. Because of the close engagement between flanges 61 and 62, any solid material which emerges from between the two comminution member is relatively fine and a maximum release of juice is effected. The solid material then passes up basket 27 upon which it is subject to centrifugal force occasioned by rotation of the basket at several thousand revolutions per minute. The solid material builds upon the basket, being retained by reason of ring 71 until it is whirled substantially completely dry of juice, after which the solid material passes between the ring 71 and the edge of the basket or over the lip of flange 74, to emerge finally as a substantially bone-dry solid.

In Figure 11 I have shown a modified form of the means employed for ensuring release of dry pulp and wherein ring 71a is supported by three pins 72a, spaced at equal distance about the ring 71a and engaged with ring 31 to support ring 71a in a spaced relation. An annular rubber strip 74b is mounted upon flange 74a and extends to abut basket 27. As the pulp creeps up the basket it is retained by the annular rubber strip until sufficient pressure is exerted to force the rubber strip aside, by which time the pulp will be dry.

From the foregoing, I believe it will be apparent that I have provided a novel and simple improved device for comminuting fruit and vegetables.

I claim:

1. In a fruit and vegetable juicer, an outer casing divided into a liquid collection portion and a solid collection portion; a basket, means for rotating the basket at high speed, said basket being a W in cross-section and being supported for rotation at the apex of the middle of the W, each V of the W being perforated along the outer leg thereof, a cutting element carried snugly by said basket and covering each V thereof, said element having an upstanding flange disposed annularly about said element and surrounding a plurality of teeth on said element, said teeth extending from above said element and having ends thereon, said element being perforated along its outer wall to discharge liquid therethrough into said liquid collection portion, said element continuing upwardly and extending to said solid collection portion to discharge solids into said portion by centrifugal force; and a cover for said basket, said cover having a feed opening therein and a stationary feed element extending downwardly from adjacent said opening cooperatively to adjacent said basket and fitting the V of said W to force material fed in through said opening against said cutting element until said material is completely macerated, said stationary feed element having a depending annular flange depending therefrom to below the ends of said teeth on said cutting element and cooperatively adjacent to said flange on said element, said flanges being spaced from each other to provide a narrow passageway therebetween for only the free passage of particles smaller than a predetermined size from between said cutting element and said basket to said solid collection portion and to confine solid particles larger than said predetermined size against passage from the cutting element and the stationary feed element.

2. In a fruit and vegetable juicer, an outer casing divided into a liquid collection portion and a solid collection portion, a basket, means for rotating the basket at high speed, said basket being a W in cross-section and being supported for rotation at the apex of the middle of the W, each V of the W being perforated along the outer leg thereof, a cutting element carried snugly by said basket and covering each V thereof, said element having a plurality of teeth thereon and being perforated along its outer wall to discharge liquid therethrough into said liquid collection portion, said teeth extending above said element and having ends thereon, said cutting element continuing upwardly and extending to said solid collection portion to discharge solids into said portion by centrifugal force, a cover for said basket, said cover having a feed opening therein and a feed element extending downwardly from adjacent said opening cooperatively to adjacent said basket and fitting the V of said W to force material fed in through said opening against said cutting element until said material is completely macerated, and a pair of cooperating, closely fitting annular flanges on said cutting element and said feed element, said flanges being spaced from each other to provide a narrow passageway therebetween for the passage from between said cutting element and said basket of liquid to said liquid collection portion and of particles smaller than a predetermined size to said solid collection portion and to confine solid material larger than said predetermined size to between said elements until said material is finer than said predetermined size, the flange on said feed element extending below the ends of the teeth on the cutting element.

3. In a fruit and vegetable juicer, an outer casing divided into a liquid collection portion and a solid collection portion; a basket, means for rotating the basket at high speed, said basket being a W in cross-section and being supported for rotation at the apex of the middle of the W, each V of the W being perforated along the outer leg thereof, said basket having a rim positioned circumferentially of the basket to retain solids in the basket to a predetermined depth, a cutting element carried snugly by said basket and covering each V thereof, said element having an upstanding flange disposed annularly about said element and surrounding a plurality of teeth on said element, said element being perforated along its outer wall to discharge liquid therethrough into said liquid collection portion, said element continuing upwardly and extending to said solid collection portion to discharge solids into said portion by centrifugal force; and a cover for said basket, said cover having a feed opening therein and a stationary feed element extending downwardly from adjacent said opening cooperatively to adjacent said basket and fitting the V of said W to force material fed in through said opening against said cutting element until said material is completely macerated, said stationary feed element having a depending annular flange depending therefrom cooperatively adjacent to and below the rim of said flange on said element to confine solid particles of a predetermined size against passage from between the cutting element and the stationary feed element.

4. In a fruit and vegetable juicer, an outer casing divided into a liquid collection portion and a solid collection portion; a basket, means for rotating the basket at high speed, said basket being a W in cross-section and being supported for rotation at the apex of the middle of the W, each V of the W being perforated along the outer leg thereof, said basket having a rim positioned circumferentially of the basket and movable in a direction parallel to the axis of rotation of the basket to retain solids in the basket to a predetermined depth, a cutting element carried snugly by said basket and covering each V thereof, said element having an upstanding flange disposed annularly about said element and surrounding a plurality of teeth on said element, said element being perforated along its outer wall to discharge liquid therethrough into said liquid collection portion, said element continuing upwardly and extending to said solid collection portion to discharge solids into said portion by centrifugal force; and a cover for said basket, said cover having a feed opening therein and a stationary feed element extending downwardly from adjacent said opening cooperatively to adjacent said basket and fitting the V of said W to force material fed in through said opening against said cutting element until said material is completely macerated, said stationary feed element having a depending annular flange depending therefrom cooperatively adjacent to and below the level of said flange on said element to confine solid particles of a predetermined size against passage from between the cutting element and the stationary feed element.

5. In a fruit and vegetable juicer, an outer casing having a liquid collection portion and a solid collection portion; a basket comprising a central hub portion having an outwardly extending and downwardly inclined integral wall portion and an outer annular wall joined thereto and upwardly inclined to form an annular trough concentric with said central hub portion, an annular perforate wall extending from said outer annular wall of said trough and arranged to convey the solids to the solid collection portion, macerating means on the walls of said trough; means for rotating said basket, a rim positioned circumferentially about and immediately above said perforate wall and including an annular rubber strip engaging the wall and movable away from said wall to provide a passageway for substantially dry solids, and a feeding element over said basket and having an opening therein for admission of fruits and vegetables, said element curving downwardly in the direction of rotation to a terminal portion close to and fitting said annular trough.

6. In a fruit and vegetable juicer, an outer casing having a liquid collection portion and a solid collection portion, a basket comprising a central hub portion having an outwardly extending downwardly inclined integral wall portion and an outer wall joined thereto and upwardly inclined to form an annular trough concentric with said central hub portion, a perforate wall extending from said outer wall of said trough and arranged to convey the solids to the solid collection portion macerating means on the walls of said trough, means for rotating said basket, a rim positioned circumferentially about and immediately above an upper portion of the perforate wall and movable to a limited extent in a direction parallel to the axis of rotation of the basket to pass solids to the solid collection portion of the outer casing, and a feeding element over said basket and having an opening therein for admission of fruits and vegetables, said element curving downwardly in the direction of rotation to a terminal portion close to and fitting said annular trough.

7. In a fruit and vegetable juicer, an outer casing having a liquid collection portion and a solid collection portion, a basket comprising a central hub portion having an outwardly extending downwardly inclined integral wall portion and an outer wall joined thereto upwardly inclined to form an annular trough concentric with said central hub portion, a perforate wall extending from said outer wall of said trough and arranged to convey the solids to the solid collection portion, macerating means on the wall of said trough, means for rotating said basket, a feeding element over said basket and having an opening therein for admission of fruits and vegetables, said element curving downwardly in the direction of rotation to an annular terminal portion close to and fitting said annular trough, said annular terminal portion and said basket each having an annular flange thereon concentrically arranged with respect to one another and overlapping and fitting one another closely to provide a narrow passageway therebetween for the only passage of particles smaller than a predetermined size from between said cutting element and said basket to said solid collection portion and to confine the material greater than said predetermined size to between the macerating means and the feeding element.

8. A device as in claim 7 wherein the annular flange on the basket and the annular terminal portion each includes a plurality of spaced teeth cooperatively provided to cut fibrous material extending between the flanges.

9. In a fruit and vegetable juicer, an outer casing having a liquid collection portion and a solid collection portion, a basket comprising a central hub portion having an outwardly extending downwardly inclined integral wall portion and an outer wall joined thereto upwardly inclined to form an annular trough concentric with said central hub portion, a perforate wall extending from said outer wall of said trough and arranged to convey the solids to the solid collection portion, macerating means on the walls of said trough, means for rotating said basket, a rim positioned circumferentially about and immediately above an upper portion of a perforated section of the perforate wall to retain solids thereon to a predetermined depth, a feeding element over said basket and having an opening therein for admission of fruits and vegetables, said element curving downwardly in the direction of rotation to an annular terminal portion close to and fitting said annular trough, said annular terminal portion and said basket each having an annular flange thereon fitting one another closely to provide a narrow passageway therebetween for the only free passage of particles smaller than a predetermined size from between said cutting element and said basket to said solid collection portion and to confine material greater than a predetermined size to between the macerating means and the feeding element.

10. In a fruit and vegetable juicer, an outer casing having a liquid collection portion and a solid collection portion, a basket comprising a central hub portion having an outwardly extending downwardly inclined integral wall portion and an outer wall joined thereto and upwardly inclined to form an annular trough concentric with said central hub portion, a perforate wall extending from said outer wall of said trough and arranged to convey the solids to the solid collection portion, macerating means on the walls of said trough, means for rotating said basket, a rim positioned circumferentially about and immediately above an upper portion of a perforated section of the perforate wall and movable to a limited extent in a direction parallel to the axis of rotation of the basket to retain solids thereon to a predetermined depth and to pass solids in excess of such predetermined depth to the solid collection portion of the outer casing, and a feeding element over said basket and having an opening therein for admission of fruits and vegetables, said element curving downwardly in the direction of rotation to a terminal portion close to and fitting said annular trough.

11. In a fruit and vegetable juicer, an outer casing having a liquid collection portion and a solid collection portion, a basket comprising a central hub portion having an outwardly extending downwardly inclined integral wall portion and an outer wall joined thereto and upwardly inclined to form an annular trough concentric with said central hub portion, a perforate wall extending from said outer wall of said trough and arranged to convey the solids to the solid collection portion, macerating means on the walls of said trough, means for rotating said basket, a rim positioned circumferentially about and immediately above an upper portion of a perforated section of the perforate wall including an annular rubber strip engaging the perforate wall and flexibly movable away from said wall to provide a passageway for dry solids, and a feeding element over said basket and having an opening therein for admission of fruits and vegetables, said element curving downwardly in the direction of rotation to a terminal portion close to and fitting said annular trough.

12. A device as in claim 2 wherein the pair of cooperating flanges each includes a plurality of cutting teeth.

JOHN E. BENNETT.

REFERENCES CITED

The following references are of record in the file of this patent:

UNITED STATES PATENTS

| Number | Name | Date |
|---|---|---|
| 1,111,600 | Mauss | Sept. 22, 1914 |
| 1,964,992 | Knapp | July 3, 1934 |
| 1,993,337 | Crowe | Mar. 5, 1935 |
| 2,272,675 | Knudsen | Feb. 10, 1942 |
| 2,280,214 | Buerk | Apr. 21, 1942 |
| 2,311,379 | Gillanders | Feb. 16, 1943 |
| 2,353,983 | Banning | July 18, 1944 |
| 2,387,975 | Bennett | Oct. 30, 1945 |

FOREIGN PATENTS

| Number | Country | Date |
|---|---|---|
| 104,368 | Australia | June 24, 1938 |
| 863,137 | France | Dec. 23, 1940 |